June 19, 1962 W. TIRASPOLSKY ETAL 3,039,735
MOTOR FOR SUBTERRANEAN WORK
Filed Oct. 28, 1957 2 Sheets-Sheet 2
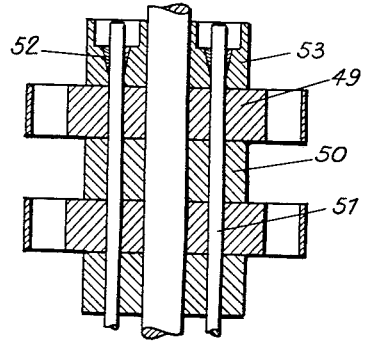
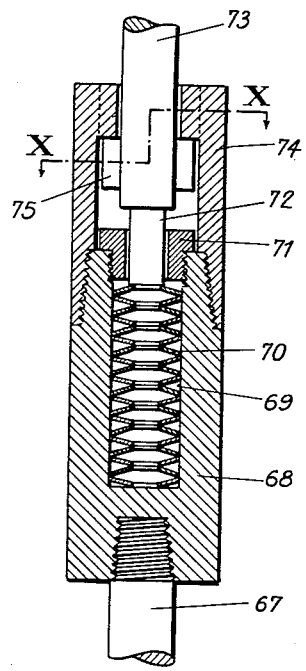
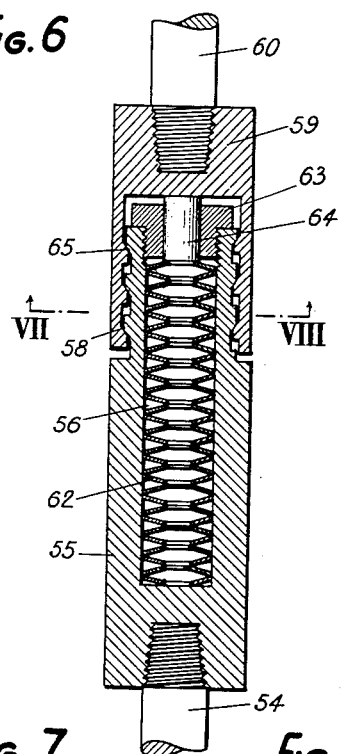
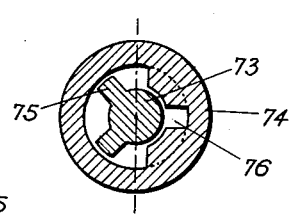
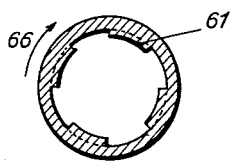
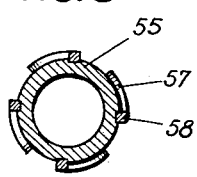

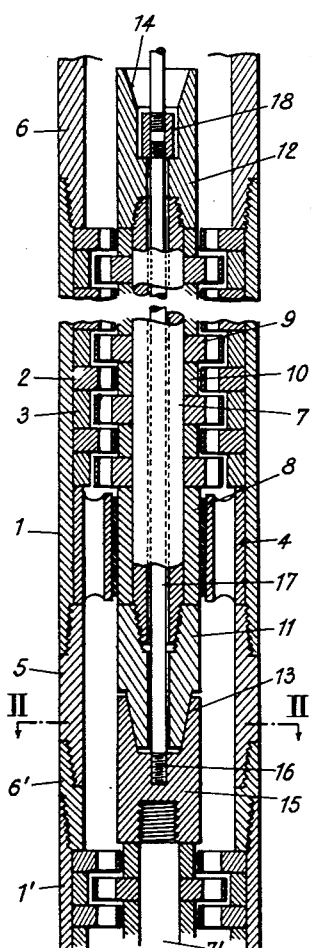
Fig. 1
Fig. 2
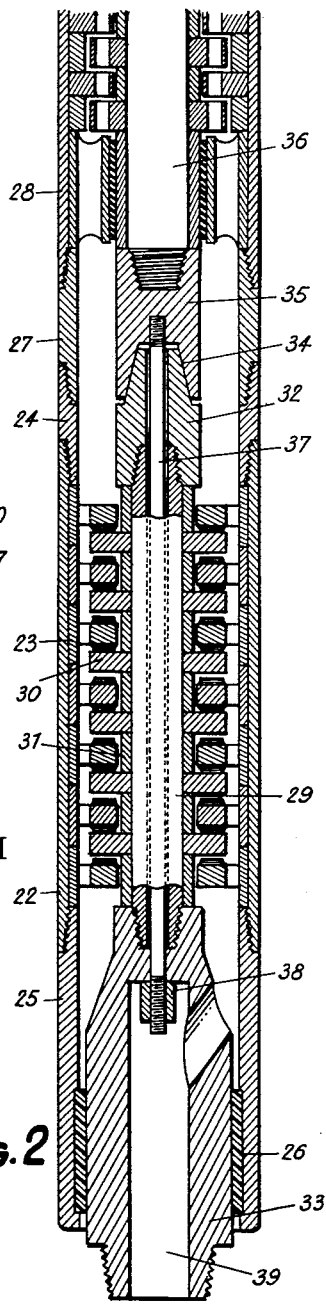
Fig. 3
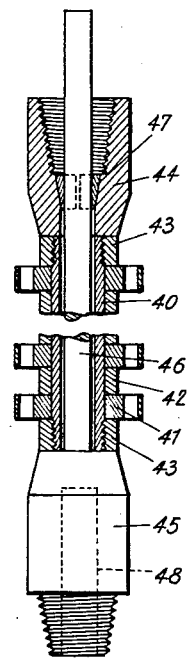
Fig. 4
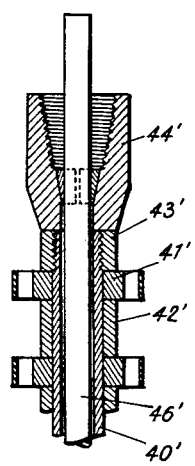

United States Patent Office 3,039,735
Patented June 19, 1962

3,039,735
MOTOR FOR SUBTERRANEAN WORK
Wladimir Tiraspolsky, Issy-les-Moulineaux, and Roger Rouviere, Aureilhan, France, assignors to Turbodrill International Corporation, Schaan, Liechtenstein
Filed Oct. 28, 1957, Ser. No. 692,945
Claims priority, application France Oct. 31, 1956
10 Claims. (Cl. 253—3)

One of the difficulties encountered when operating subterranean drilling motors, particularly drilling turbines for the exploitation of oil fields resides in the necessity of frequently dismantling the motor in a complete or substantially complete manner for replacing or repairing such parts as may have been rapidly damaged during service. Such parts particularly comprise the shaft thrust bearing, the lower thrust bearing of the turbine and also some additional devices such as a braking device which may be incorporated with the motor. Complete disassembly and reassembly of the motor involve heavy costs and necessitate a fairly long overhauling time and specially equipped workshops.

Moreover in order to obtain high power torques in the case of drilling turbines, it is necessary to provide turbines of great length. However the required length is sometimes such that it makes it impossible to transport the assembled turbines and to erect them under this form in the drilling tower. This problem was solved by building up turbines made of two or more elements or sections which are transported separately and subsequently assembled into erected condition in the drilling tower. However while couplings between stator parts can be perfectly achieved by known means, the coupling of rotor parts of adjacent elements has been carried out imperfectly heretofore.

Furthermore in order to be able to adapt to temporary drilling conditions (nature of the soil, character of the tools, pump characteristics, deviation angle, etc.) it is necessary to provide adjacent the well or hole in the course of drilling an important depot of turbines of miscellaneous types possessing different characteristics. It is therefore desirable to be able to rapidly modify the features of turbines in service by adding thereto or subtracting therefrom some of their constitutive elements or sections.

An object of the invention is to overcome the aforesaid difficulties by the provision of a coupling device for elements of drilling turbines or subterranean motors capable of performing a rigid and positive mechanical connection between the rotor parts of two coupled elements for all operative conditions of the motor.

Another object of the invention is to provide a device as aforesaid permitting a rapid and easy coupling and uncoupling on the working site by means of a minimum number of tools and without any need to resort to highly skilled labor.

Viewed in one general aspect, the invention is embodied in a coupling device for elements of subterranean motors and particularly drilling turbines characterized by the fact that it presents bearing surfaces which so mutually cooperate as to ensure the transmission of force, particularly of the power torque respectively provided on parts belonging to the two elements of the motor or turbine which must be coupled together or capable of being operatively connected to said elements for joint angular motion, and at least one elastic member working by tension or compression for pressing said bearing surfaces against each other so as to provide a rigid mechanical connection, means being provided for permitting a ready uncoupling of said elements by releasing the aforesaid elastic member or by permitting a positive escapement of the bearing surfaces.

Such bearing surfaces of the coupling device may be flat, conical, helico-conical or otherwise shaped and are preferably so formed as to provide transmission of the torque in the one or the other direction, produce transmission of an axial tractional or compressional stress and achieve relative centering of the motor or turbine elements assembled as above-stated.

The elastic member or members may be constituted by one or several tighteners interconnecting parts of the two elements or by springs operating for example by compression and interposed between said elements for ensuring mutual pressurized application of the bearing surfaces.

The means permitting a rapid coupling or uncoupling may comprise locking members such as nuts, keys, feathers, cotter pins, clamping wedges or the like operative upon the elastic member or members for holding them in such working position as will provide tight intercontact of the bearing surfaces. Alternatively said means may be embodied in a particular distribution of the bearing surfaces permitting them to be brought into engagement, for example by an angular motion which may be rendered possible by overcoming the elastic resistance of those members which provide mutual pressurized application of said bearing surfaces.

Viewed in a more specific aspect as it is embodied in a suitable constructional form, the invention provides a coupling device wherein adjacent the ends of the rotor structure of a subterrranean motor or drilling turbine element end members or spigots are provided having bearing surfaces (for instance of conical shape) and one or several tighteners anchored to the end member of a turbine element and engaged lengthwise through the oppositely located end member of the adjacent element and the entirety of said element so as to be removably locked under tension adjacent the other end of said element. For instance, the locking action may be performed by means of one or several nuts screwed upon the threaded end of the tightener or tighteners and abutted against a thrust bearing surface. The turbine elements thus assembled may be sections containing stator and rotor blades or containing thrust bearings or additional devices.

Viewed in a still more specific aspect, the invention is embodied in an improved coupling wherein the rotor structural parts of a subterranean motor or drilling turbine element may be stacked on a tubular shaft or on prestressing tighteners while providing thrust bearing surfaces adjacent each end, assembling end members or spigots being provided in abutting relation with said end bearing surfaces, said end members being interconnected through the stack of parts by one or several tighteners which press the bearing surfaces against each other. Said end members may be connected from one element to the other one, for example by threaded joints or unions.

A further object of the invention is to provide, in a still more specific aspect thereof, a coupling device wherein the shafts of two elements of the motor or turbine which must be mutually coupled are fitted with end members having bearing surfaces capable of being brought into mutual engagement in bayonet joint fashion and of being held applied in mutual contact by one or several springs operating by compression whose elastic force must be overcome for achieving the coupling action, the bearing surfaces being either flat or conical in which latter case the larger bearing surface which is obtained for a given elastic force permits the transmitted torque to be enhanced.

With these and such other objects in view as will incidentally appear hereafter, the invention comprises the novel construction and combination of parts that will now be described in detail with reference to the accompanying diagrammatic drawings exemplifying the same and forming a part of the present disclosure.

In the drawings:

FIGURE 1 is a longitudinal sectional view of a length of a drilling turbine made up of several elements which are coupled by means of a device constituting a constructional form of the invention.

FIGURE 2 is a cross sectional view along the line II—II in FIG. 1 showing a constructional modification.

FIGURE 3 is a longitudinal sectional view showing a further constructional modification.

FIGURE 4 stud 116 as shown is a longitudinal sectional view of a portion of the rotor structure of a drilling turbine made up of several elements coupled according to the invention.

FIGURE 5 is a part sectional view drawn to a larger scale showing a detail of a constructional modification.

FIGURE 6 is a longitudinal sectional view of a coupling device forming a still further constructional modification.

FIGURES 7 and 8 are cross sectional views of constructional details along the line VII—VIII in FIG. 6.

FIGURE 9 is a longitudinal sectional view of still another constructional modification.

FIGURE 10 is a corresponding cross sectional view along the line X—X in FIG. 9.

In the showing of FIGS. 1 and 2 is illustrated a coupling device arranged between a power element of a drilling turbine and a neighboring power element of said turbine. The power element as shown comprises a body portion 1 in which stator parts 2 and annular intermediate or bracing members 3 are alternately stacked. A bearing unit 4 is arranged under said stack of parts. The several parts 2, 3, 4 are compressed when being assembled in the body portion by end sleeves 5, 6 so as to form an independent one-piece assembly. Inside said power element is a rotor structure including a shaft 7 on which are stacked a bearing ring 8 and rotor parts 9 arranged in alternate relation with annular bracing members 10. The several parts 8, 9, 10 are compressed between end members or spigots 11, 12 which are screwed upon the threaded ends of the shaft 7 so that said rotor structure also forms an independent assembly. The end members 11, 12 have free conical ends 13, 14 which are adapted to ensure coupling of the shaft 7 with the other shafts to which it must be connected. Independent stator and rotor structures are thus obtained which it is only sufficient to assembly to other similar assemblies for building a complete and self-contained turbine.

The stator structure of the adjacent turbine element may be operatively connected to that of the above-described element by screwing a sleeve 6' on the sleeve 5 which belongs to said element. The connection between the rotor parts is ensured by the male and female cones 13, 14 of the end members 11, 12 secured to the extremities of the shaft 7. In FIG. 1 is shown the upper end of the rotor assembly which belongs to that element situated immediately underneath the aforesaid element. Such a rotor assembly includes a shaft 7' to which is fixed an end member 15 having a female cone which has a push fit upon the male cone 13. Said end member 15 has a threaded blind hole 16 in which is screwed the lower threaded end of a tightener 17 extending through a bore in the end member 11, 12 and shaft 7. The upper end of said tightener 17 which is also threaded projects into a counter-bore of the end member 12 and receives a tensioning nut 18. During the assembling operation, the tightener 17 is engaged into said bore of the shaft 7. Tensioning or tightening as performed ensures an angular junction of the rotor parts by the cones 13, 15 which are thus mutually compressed. All stresses (torque, traction, etc.) may be thus transmitted from one rotor structure to the other. As visible in the upper part of FIG. 1, the nut 18 is sufficiently high for receiving the lower end of another tightener (not shown) which performs the connection with the illustrated rotor structure.

In the constructional modification shown in section in FIG. 2, the male and female cones which are nested into each other have cooperating flutes 19 and 20 which provide a larger torque transmission than that which would be performed by a smooth cone.

In the showing of FIG. 3 is represented a drilling turbine wherein the coupling is so provided as to permit the lower end portion of the turbine to be dismantled or removed, said end portion containing all elements liable to undergo a swift wear or necessitating frequent overhauls or replacements such as the lower thrust bearing elements without involving a disassembly of the other elements of the turbine.

In this constructional modification, the body portion 22 contains a stack of stationary abutment discs 23 which are compressed between the sleeves 24, 25 screwed upon said body portion. The lower sleeve 25 is internally fitted with rubber as shown at 26 so as to form the lower bearing of the turbine. The sleeve 24 is threaded for being coupled to the sleeve 27 screwed to the body portion 28 of the upper element which contains the stator parts of the turbine.

The shaft 29 of the rotor structure of the lower element carries a stack of abutment discs 30 and annular intermediate bracing members 31 which are mutually alternated. Said stacked rotor structure is compressed between the end member 32 screwed to the threaded upper extremity of the shaft and the end member 33 screwed upon its lower extremity. The end member 32 has a cone 34 which cooperates with the complementary cone of an end member 35 screwed to the shaft 36 of the upper turbine element in a manner similar to that described with reference to FIG. 1. The connection for joint angular motion for coupling purposes is performed in the present case by a tightener 37 screwed in an internally threaded portion of the end member 35 and shaft 29. The lower threaded extremity of said tightener 37 is engaged in a counter-bore 39 in the end member 33 which forms a collector or header for the circulating fluid that flows through the drilling turbine and receives on its threaded end a nut 38 which performs proper tightening and coupling.

During the assembly, the tightener 37 is first screwed into the end member 35 and the end member 32, the shaft 29 and the end member 33 is then engaged over it. After locking the sleeve 24 on the sleeve 27, the tightener 37 is subjected to proper tension by means of the nut 38. It will be seen that this arrangement permits dismantling of the lower end of the turbine which contains the elements subjected to swift wear and replacement thereof without necessitating a disassembly of the remaining elements.

In the other constructional modification shown in FIG. 4, the transmission of the efforts from a shaft to one element of the shaft of the adjacent element takes place along flat surfaces. For simplifying the illustration, only the rotor part has been shown. Each turbine element comprises in this case a tubular shaft 40 in which are engaged rotor parts 41 and annular intermediate or bracing members 42. Such parts are compressed and prestressed upon the tubular shaft 40 by nuts 43 screwed upon the threaded ends of the shaft. The turbine element under consideration also includes end members 44, 45 formed respectively with a female thread and a male thread permitting a thread connection between the end members of the several elements of which the turbine is made up. The lower end member of an element is provided with a central tightener 46 rigidly connected to the end member 45 and extending through the bore in the tubular shaft 40 and up through the upper end member 44. For purposes of assembly, the end member 45 of a turbine element is screwed upon the end member 44' of that element which is situated immediately under it, the tightener 46' belonging to that element being received in a recess 48 in the end member 45, whereafter the rotor structure as shown in FIG. 4 is positioned over the tightener 46. As the assembly of the stator parts of the elements is simple, it is not described here because technicians skilled in the art will readily understand it. The tightener 46 belonging to said element is then subjected to proper tension and locked in position by means of conical wedges made of several parts 47.

According to the other constructional modification as shown in FIG. 5, the stacks of each element of the rotor structure of the turbine are made up of alternated rotor parts 49 and intermediate bracing rings 50 which are fixed under given prestressed conditions by tighteners 51 locked in tension by conical wedges 52 made up of several parts and received in recesses 53 formed at the ends of the stack. The stack parts provide an axial passage for the coupling tightener 46.

In the showing of FIGS. 6, 7 and 8 is illustrated a coupling device arranged between two rotor parts of adjacent turbine elements involving a bayonet coupling system subjected to tension by springs. In this constructional form, the upper end of the shaft 54 of an element to be coupled carries an end member or spigot 55 in which is defined a recess 56. Said end member is externally provided adjacent its upper end with discontinuous circular fillets or ribs 57 (FIG. 8) defining longitudinal grooves. Such circular ribs 57 are delineated by springs 58. An end member 59 screwed upon the lower end of the upper turbine element shaft 60 to be coupled is internally provided with discontinuous circular fillets or ribs 61 defining longitudinal grooves (FIG. 7). Coupling of the two turbine elements may be achieved by a push fit of the end member 55 into the end member 59 to a given angular relation and mutual engagement of the ribs 57, 61 which constitute the bayonet joint responsive to a relative angular displacement. The longitudinal feathers 58 forming abutments facilitate the transmission of the torque between the turbine elements.

In order to maintain the coupling in engaged position, there is provided in the recess 56 formed in the end member 55 a stack of annular springs 62 which may be of the Belleville type, for example. Such springs are held in the recess 56 by a member 63 screwed into the end member 55. A cylinder 64 is fulcrumed on the springs 62 and normally projects with respect to the member 63, thereby performing compression of the springs when the end members 53 and 59 are forced into their recesses for effecting the coupling.

During the assembling, the springs 62 are compressed by a pressure exerted by the shaft 60. The parts are preferably so sized as to make it necessary for the springs 62 to be strongly compressed for rotating the end member 59 with respect to the end member 55 so as to achieve the coupling. The fillets or ribs 57, 61 then cooperate. As the axial thrust exerted by the shaft 60 is relieved, the springs powerfully compress the ribs 61 against the ribs 57 thereby performing a rigid interconnection of the shafts 54 and 60. For increasing the torque which may be transmitted for a given axial compressive stress, the contacting side faces of the ribs 57, 61 are advantageously inclined as shown at 65. Alternatively the circumferential grooves defined by the ribs may have a helical shape. The resultant helicoid will advantageously have a left-handed pitch, assuming the direction of the torque to be as indicated by the arrow 66 in FIG. 7 so as to clamp the ribs 61 between the feathers 58 and the sloping side of the ribs 57.

According to the constructional modifications shown in FIGS. 9 and 10, the shaft 67 is provided at its upper extremity with an end member 68 having a recess 69 receiving annular springs 70 held down in said recess by a member 71 and normally repelling a cylinder 72 outwardly. The shaft 73 of the upper element to be coupled slides through an end member 74 screwed upon the free threaded end of the end member 68. The bayonet device is constituted, as visible in FIG. 10, by the stub shaft 73 of said upper element which carries fillets or ribs 75 engageable through grooves 76 in the flange of said member 74 and retainable under said flange following an angular motion. Coupling is also performed in this constructional form owing to a compression of the springs 70 by reason of the thrust exerted by the shaft 73 upon the cylinder 72. The elastic force of the springs maintains the coupling while permitting transmission of the efforts of one shaft to the other. Abutments may be provided for increasing the transmissible torque for a given compressive stress.

Minor constructional details may be varied without departing from the scope of the subjoined claims.

What is claimed is:

1. In a drilling turbine motor for subterranean work made up of several separate interconnectable sections each of which includes a stator part and a rotor part, threaded joints on the ends of said stator part, end members secured to the extremities of said rotor part, coupling surfaces provided on said end members for transmitting forces between the rotor parts of adjacent sections, resilient means associated with the end members of the rotor parts of adjacent sections maintaining said coupling surfaces in engagement with each other in a force-transmitting condition, and locking means for maintaining said end members and said resilient means in said stress transmitting condition.

2. In a drilling turbine motor for subterranean work made up of several separate interconnectable sections each of which includes a stator part and a rotor part, a shaft carrying said rotor part and extending through the whole length of each section, threaded joints on the ends of the stator part, primary and secondary end members secured to the extremities of said shaft, coupling surfaces provided on said end members for transmitting forces between adjacent shafts of adjacent sections, a longitudinal bore provided in said shaft, a threaded hole provided in the secondary end member of one section, a bore provided in the primary end member of an adjacent section in axial coincidence with the bore of said shaft, a tightener screwed in the threaded hole of the secondary member of said one section and arranged within the bores of said primary end member and of said shaft of the adjacent section, a bore provided in the secondary end member of said adjacent section, said tightener having an end portion protruding through said last-named bore, and locking means for securing said tightner in a stressed condition in said secondary end member of said adjacent section.

3. A motor for subterranean work according to claim 2, wherein the tightener is provided with threaded end portions, and said locking means comprises a nut screwed on the end portion of said tightener which protrudes through said secondary member.

4. In a drilling turbine motor for subterranean work made up of several separate interconnectable sections each of which includes a stator part and assembled rotor parts, a shaft carrying said rotor parts and extending through the whole length of each section, threaded joints on the ends of said stator part, end members secured to the extremities of said shaft maintaining the assembly of the rotor parts, a longitudinal bore provided in said shaft, a tightener located within said bore, said tightener having end portions protruding through said end members, a primary joint member secured on one end portion of said tightener, a hollow secondary joint member engaged over the other end portion of said tightener, locking means for securing said secondary joint member in position on said tightener, and assembling means provided on said primary and second joint members for securing together a primary joint member of one section with the secondary joint member of an adjacent section.

5. A motor for subterranean work according to claim 4, wherein said locking means comprises a conical seat provided in said secondary joint member, and conical wedges surrounding said tightener and pressed against said conical seat for maintaining said tightener in a stressed condition.

6. In a drilling turbine motor for subterranean work made up of several separate interconnectable sections each of which includes a stator part and a rotor part, threaded joints on the ends of said stator part, end members secured to the extremities of said rotor part, coupling surfaces provided on said end members for transmitting forces between adjacent shafts of adjacent sections, longitudinal bores extending through said rotor part, tighteners arranged within said longitudinal bores, said tighteners having end portions protruding beyond the end members of each section, and assembling means provided on said tightener end portions for securing together the tighteners of two adjacent sections.

7. In a drilling turbine motor for subterranean work wherein said turbine is composed of a plurality of interconnectable separate sections, each section including a tubular stator casing having stator components mounted therein and affixed thereto and a rotor part rotatably located within said casing, said rotor part including a shaft coaxially extending through said casing having a plurality of rotor components mounted thereon in stacked relation and operatively associated with said stator components, threaded joints defined on the ends of said casing permitting adjacent casings to be affixed together in end to end relation, end members secured to the ends of said shaft bearing on the adjacent rotor components maintaining said shaft, rotor components and end members in rigid assembly and coupling means provided on said end members whereby adjacent shafts of adjacent sections are coupled together in force transmitting relation.

8. In a drilling turbine motor for subterranean work wherein said turbine is composed of a plurality of interconnectable separate sections, each section including a tubular stator casing having stator components mounted therein and affixed thereto and a rotor part rotatably located within said casing, said rotor part including a shaft coaxially extending through said casing having a plurality of rotor components mounted thereon in stacked relation and operatively associated with said stator components, threaded joints defined on the ends of said casing permitting adjacent casings to be affixed together in end to end relation, end members secured to the ends of said shaft bearing on the adjacent rotor components maintaining said shaft, rotor components and end members in rigid assembly, coupling surfaces defined on said end members, the coupling surfaces of end members of adjacent interconnected sections being engageable in a force transmitting manner and tightening means operatively interposed between and secured to adjacent rotor parts maintaining said engaged coupling surfaces in locked force transmitting relation.

9. In a drilling turbine as in claim 8 wherein said tightening means comprise an axial bore defined in said shaft extending therethrough, a rod extending through said bore and means operatively affixing one end of said rod to the end member of a shaft of an adjacent section and the other end of said rod to the end member of the shaft through which the rod extends remote from said adjacent section end member.

10. In a drilling turbine as in claim 9 wherein said coupling surfaces are conical in configuration.

References Cited in the file of this patent

UNITED STATES PATENTS

| | | |
|---|---|---|
| 880,479 | Buck | Feb. 25, 1908 |
| 2,348,047 | Yost | May 2, 1944 |
| 2,646,962 | Wagner | July 28, 1953 |
| 2,650,017 | Pedersen et al. | Aug. 25, 1953 |
| 2,685,405 | Stalker | Aug. 3, 1954 |
| 2,736,384 | Potts | Feb. 28, 1956 |
| 2,819,880 | Gilchrist | Jan. 14, 1958 |